(12) United States Patent
Chueh et al.

(10) Patent No.: US 8,725,220 B2
(45) Date of Patent: May 13, 2014

(54) POWER SAVING METHOD AND RELATED COMMUNICATION DEVICE

(75) Inventors: Hsin-Ti Chueh, Taoyuan County (TW); Win-Chyi Gong, Taoyuan County (TW); Wen-Jui Hsieh, Taoyuan County (TW); Chien-Nan Lin, Taoyuan County (TW); Chen-Huang Fan, Taoyuan County (TW); Chun Tai, Taoyuan County (TW); Chang-Hsin Su, Taoyuan County (TW); Chen-Han Shih, Taoyuan County (TW); Ching-Hao Lee, Taoyuan County (TW); Chi-Leng Wang, Taoyuan County (TW); Chia-Wei Chen, Taoyuan County (TW); Yu-Chuan Lai, Taoyuan County (TW); Chi-Sheng Kai, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/609,311

(22) Filed: Sep. 11, 2012

(65) Prior Publication Data

US 2013/0005333 A1 Jan. 3, 2013

Related U.S. Application Data

(60) Provisional application No. 61/583,207, filed on Jan. 5, 2012, provisional application No. 61/605,200, filed on Mar. 1, 2012, provisional application No. 61/605,207, filed on Mar. 1, 2012, provisional application No. 61/606,480, filed on Mar. 5, 2012.

(51) Int. Cl.
*H04M 1/00* (2006.01)
*H04B 1/38* (2006.01)

(52) U.S. Cl.
USPC ........... 455/574; 455/436; 455/437; 455/444; 455/522; 455/343.1; 370/311; 370/318; 370/328; 370/331

(58) Field of Classification Search
USPC ........... 455/432.1, 434, 436–444, 448, 67.13, 455/522, 553.1, 574, 343.1; 370/311, 318, 370/328, 329, 330, 331, 332, 333
See application file for complete search history.

(56) References Cited

U.S. PATENT DOCUMENTS 6,400,946 B1 * 6/2002 Vazvan et al. ............... 455/432.1
6,563,807 B1 * 5/2003 Kim et al. ..................... 370/331

(Continued)

FOREIGN PATENT DOCUMENTS

EP        1885144 A2    2/2008
EP        2330761 A2    6/2011

(Continued)

OTHER PUBLICATIONS

European patent application No. 12006813.5, European Search Report mailing date: May 2, 2013.

(Continued)

*Primary Examiner* — Olumide T Ajibade Akonai
(74) *Attorney, Agent, or Firm* — Winston Hsu; Scott Margo

(57) ABSTRACT

A power saving method for a mobile device in a wireless communication system is disclosed. The power saving method comprises obtaining a first parameter according to a first signal transmitted between the mobile device and a first network; estimating a first power consumption of the mobile device in the first network according to the first parameter and a first radio access technology (RAT) employed in the first network; determining whether the first network is suitable according to at least a comparison of the first power consumption with a second power consumption of the mobile device in a second network, wherein the second network employs a second RAT different from the first RAT; and switching to a the second network when the first network is not suitable.

16 Claims, 7 Drawing Sheets

(56) References Cited

U.S. PATENT DOCUMENTS

| | | |
|---|---|---|
| 6,725,058 B2 * | 4/2004 | Rinne et al. .................. 455/553.1 |
| 6,731,957 B1 * | 5/2004 | Shamoto et al. .............. 455/574 |
| 6,748,246 B1 * | 6/2004 | Khullar .......................... 455/574 |
| 7,848,776 B2 * | 12/2010 | Akiba et al. ................. 455/552.1 |
| 8,010,112 B1 | 8/2011 | Delker |
| 8,230,246 B1 * | 7/2012 | Sharkey ........................ 713/320 |
| 8,265,039 B2 * | 9/2012 | Reza et al. .................... 370/332 |
| 8,346,315 B2 * | 1/2013 | Lindoff et al. ................ 455/574 |
| 2007/0004445 A1 * | 1/2007 | Dorsey et al. ................ 455/525 |
| 2007/0147317 A1 * | 6/2007 | Smith et al. .................. 370/338 |
| 2007/0263574 A1 * | 11/2007 | Lu et al. ........................ 370/338 |
| 2008/0233955 A1 * | 9/2008 | Narang et al. ................ 455/434 |
| 2010/0022246 A1 * | 1/2010 | Miki et al. .................... 455/436 |
| 2010/0273486 A1 | 10/2010 | Kharia |
| 2011/0151944 A1 * | 6/2011 | Morgan ........................ 455/574 |

FOREIGN PATENT DOCUMENTS

| | | |
|---|---|---|
| JP | 200811452 A | 1/2008 |
| WO | 0203733 A1 | 1/2002 |
| WO | 2009039435 A1 | 3/2009 |

OTHER PUBLICATIONS

European patent application No. 12006813.5, European application filed: Sep. 24, 2012, European Search Report mailing date: Oct. 1, 2013.

Office Action mailed on Nov. 12, 2013 for the Japanese Application No. 2012-222770, filing date Oct. 5, 2012, pp. 1-4.

* cited by examiner

POWER SAVING METHOD AND RELATED COMMUNICATION DEVICE

CROSS REFERENCE TO RELATED APPLICATIONS

This application claims the benefit of U.S. Provisional Application No. 61/583,207 filed on Jan. 5, 2012 and entitled "Cellular networks switching method under WLAN network for power saving", the benefit of U.S. Provisional Application No. 61/606,480 filed on Mar. 5, 2012 and entitled "Power based cellular networks switching method", the benefit of U.S. Provisional Application No. 61/605,207 filed on Mar. 1, 2012 and entitled "RAT change method for battery life improvement", and the benefit of U.S. Provisional Application No. 61/605,200 filed on Mar. 1, 2012 and entitled "RAT selection method for battery life improvement", the contents of which are incorporated herein.

BACKGROUND OF THE INVENTION

1. Field of the Invention

The application relates to a power saving method used in a wireless communication system and related communication device, and more particularly, to a power saving method of switching to a low power consumption network in the wireless communication system and related communication device.

2. Description of the Prior Art

Mobile devices, such as cellular telephones, tablet computer systems, and personal digital assistants, may provide computing and communication capabilities such as voice calls, electronic messaging, web browsing, audio/video recording and playback, and other capabilities. Because a mobile device may be powered by a battery, use of these features causes the battery level to reduce. The battery must eventually be recharged, which may be inconvenient to a user. Thus, a desire exists for reducing power consumption in mobile devices in order to prolong time between battery charges.

SUMMARY OF THE INVENTION

A power saving method for a mobile device in a wireless communication system is disclosed to switch between networks according to power consumption.

A power saving method for a mobile device in a wireless communication system is disclosed. The power saving method comprises obtaining a first parameter according to a first signal transmitted between the mobile device and a first network; estimating a first power consumption of the mobile device in the first network according to the first parameter and a first radio access technology (RAT) employed in the first network; determining whether the first network is suitable according to at least a comparison of the first power consumption with a second power consumption of the mobile device in a second network, wherein the second network employs a second RAT different from the first RAT; and switching to the second network when the first network is not suitable.

A power saving method for a mobile device in a wireless communication system is disclosed. The power saving method comprises connecting to a wireless local area network (WLAN); checking which network the mobile device is camping on; determining the WLAN stays connected for a first predetermined time and a signal strength level of the WLAN is above a predetermined value when the mobile device is camping on a first network; and handing off to a second network which employs a different radio access technology (RAT) from the first network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
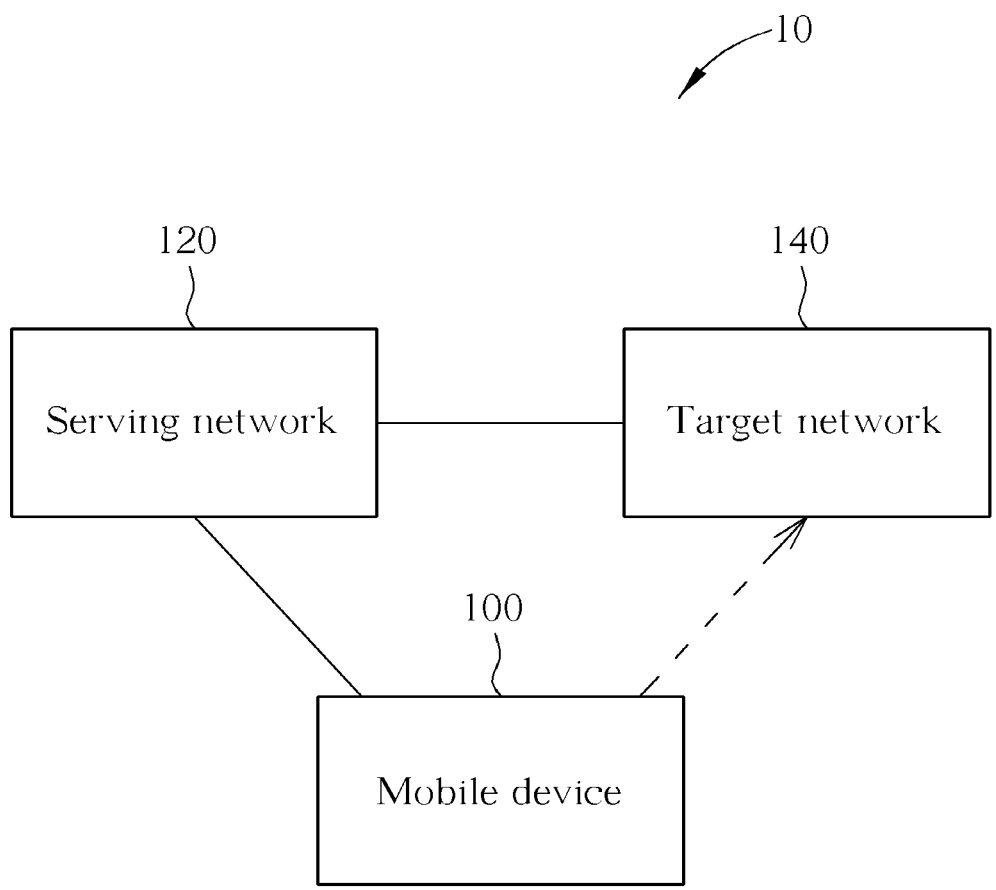
FIG. 1 is a schematic diagram of an exemplary wireless communication system.

Please refer to FIG. 1, which simply illustrates an exemplary wireless communication system 10. In FIG. 1, a serving network 120 and a target network 140 employ different radio access technologies (RATs), and the mobile device 100 supporting both of the RATs is served by the serving network 120. The serving network 120 may be referred to as a LTE (long-term evolution) or a HSPA+ (High Speed Packet Access Plus) system network, a UMTS (Universal Mobile Telecommunications System) system network while the target network 140 may be referred to as a network of a GSM system or a GERAN Iu mode system. In the LTE system, the network is referred as an evolved-UTRAN (E-UTRAN) comprising a plurality of eNBs (evolved-Node Bs). In the UMTS system, the network is referred as a Universal Terrestrial Radio Access Network (UTRAN) comprising a radio network controller (RNC) and a plurality of NBs (Node Bs); In the GSM/GERAN Iu mode system, the network is referred as a GERAN comprising a base station controller (BSC) and a plurality of base stations. The mobile device is referred to as a user equipment (UEs) or a mobile station (MS) supporting the abovementioned RATs and may be a device such as a mobile phone, a computer system, etc. Besides, the networks 120 and 140 and the mobile device 100 can be seen as a transmitter or receiver according to transmission direction, e.g., for uplink (UL), the mobile device 100 is the transmitter and the networks 120 and 140 are the receivers, and for downlink (DL), the networks 120 and 140 are the transmitters and the mobile device 100 is the receiver. Please note that it is not necessary that the serving network 120 and target network 140 are two different systems. Two identical or similar systems are also included in the scope of the present disclosure.

Figure 2:
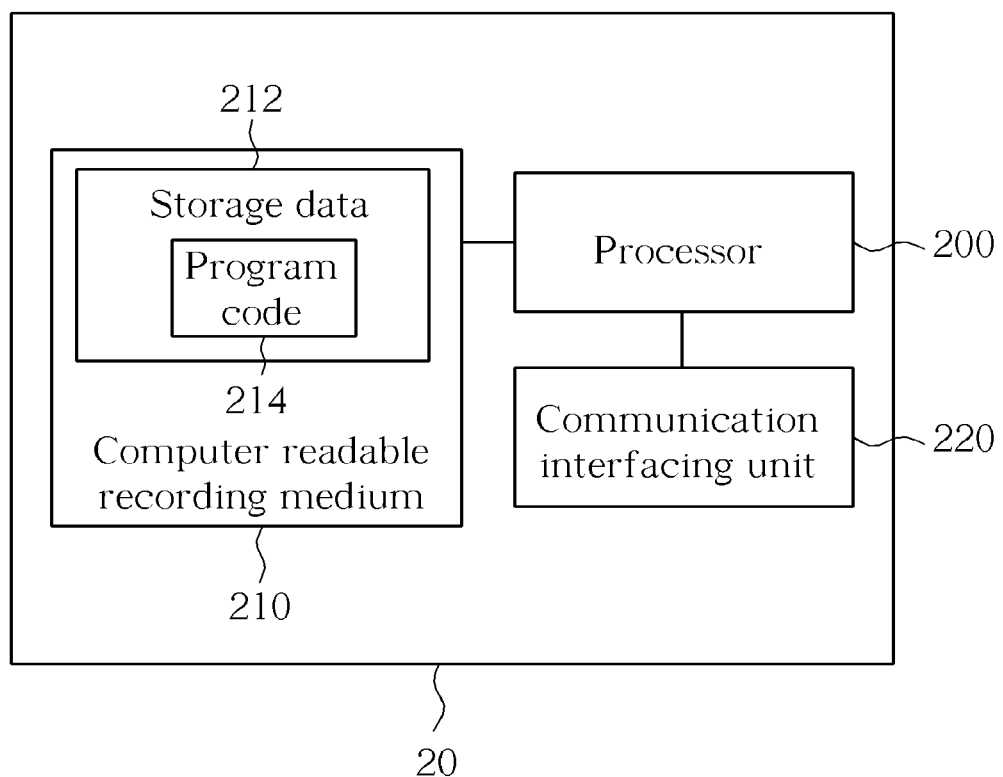
FIG. 2 is a schematic diagram of an exemplary communication device.

Please refer to FIG.2, which is a schematic diagram of an exemplary communication device 20. The communication device 20 can be the mobile device 100 or the networks 120 and 140 shown in FIG.1 and includes a processor 200, a computer readable recording medium 210 and a communication interfacing unit 220. The computer readable recording medium 210 maybe any data storage device that stores storage data 212, including program code 214, thereafter read and processed by the processor 200. Examples of the computer readable recording medium 210 includes a subscriber identity module (SIM), read-only memory (ROM), random-access memory (RAM), CD-ROMs, magnetic tapes, hard disks, optical data storage devices, and carrier waves (such as data transmission through the Internet). The communication interfacing unit 220 is preferably a radio transceiver for wirelessly communicating with other communication devices and can transform process results from the processor 200 into radio signals.

Figure 3:
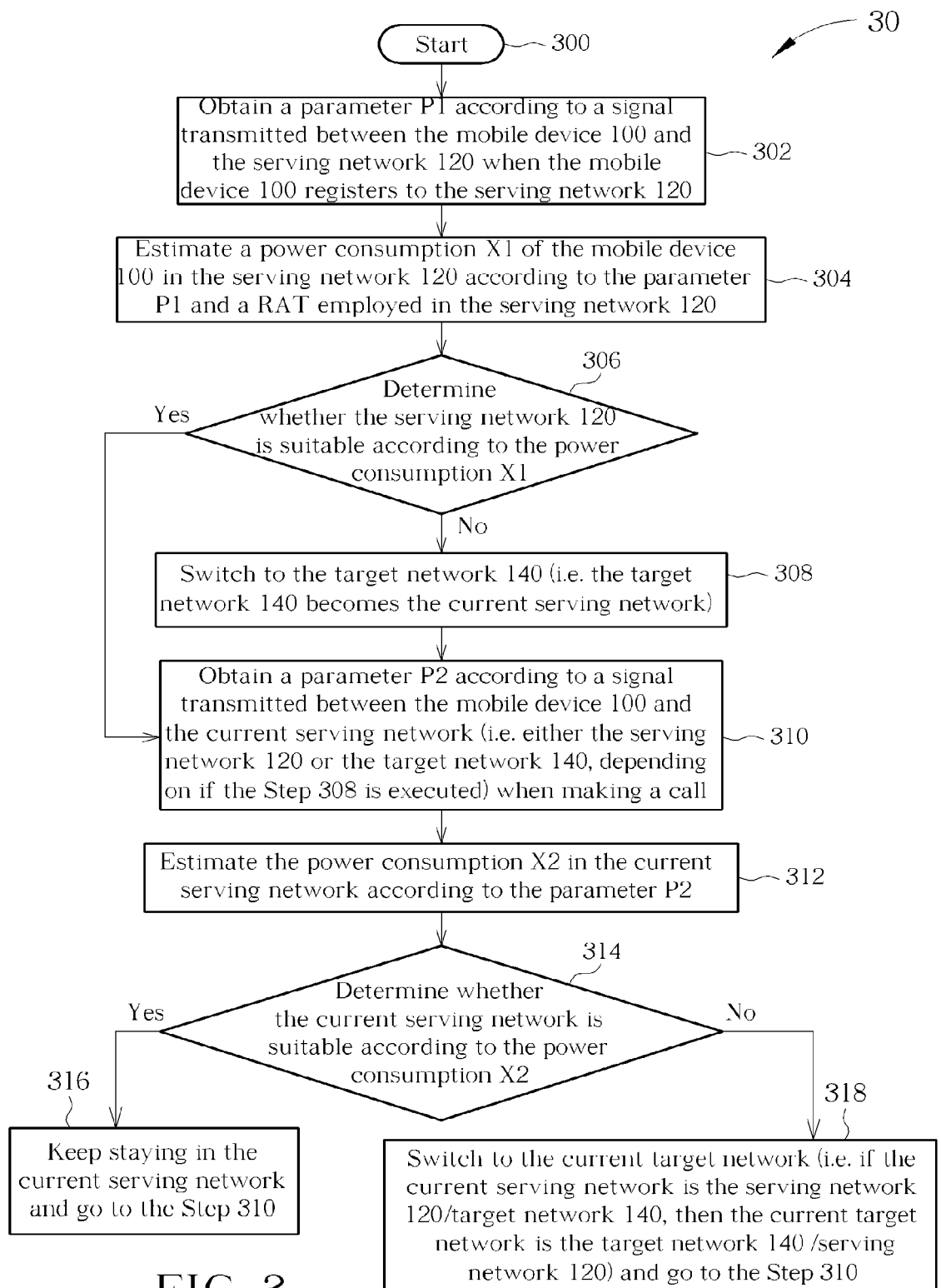
FIG. 3 is a flow chart of an exemplary process.

Please refer to FIG. 3, which is a flow chart of a process 30. The process 30 is used in the mobile device 100 for power saving in the wireless communication system 10. The process 30 can be compiled into the program code 214 and includes the following steps:

Step 300: Start.

Step 302: Obtain a parameter P1 according to a signal transmitted between the mobile device 100 and the serving network 120 when the mobile device 100 registers to the serving network 120.

Step 304: Estimate a power consumption X1 of the mobile device 100 in the serving network 120 according to the parameter P1 and a RAT employed in the serving network 120.

Step 306: Determine whether the serving network 120 is suitable according to the power consumption X1. If so, go to the Step 310; if not, go to the Step 308.

Step 308: Switch to the target network 140 (i.e. the target network 140 becomes the current serving network).

Step 310: Obtain a parameter P2 according to a signal transmitted between the mobile device 100 and the current serving network (i.e. either the serving network 120 or the target network 140, depending on if the Step 308 is executed) when making a call.

Step 312: Estimate the power consumption X2 in the current serving network according to the parameter P2.

Step 314: Determine whether the current serving network is suitable according to the power consumption X2. If so, go to the Step 316; if not, go to the Step 318.

Step 316: Keep staying in the current serving network and go to the Step 310.

Step 318: Switch to the current target network (i.e. if the current serving network is the serving network 120/target network 140, then the current target network is the target network 140/serving network 120) and go to the Step 310.

According to the process 30, the mobile device 100 registers to the serving network 120 and obtains the parameter P1 according to the signal transmitted between the mobile device 100 and the serving network 120, e.g. this signal may be received by the mobile device 100 and include the parameter P1 or the mobile device 100 may derive the parameter P1 from the received signal. The parameter P1, preferably, can be a transmission (TX) level or a TA (timing advance) value sent by the serving network 120, or any parameter which have a positive correlation between average current consumption and distance. Please note that in general, the TX level or TA value can be obtained when the mobile device 100 establishes a wireless link with the serving network 120, e.g. registering to the serving network 120, exchanging signaling with the serving network 120, making a call, etc. Then, the mobile device 100 estimates the power consumption X1 according to the parameter P1 (e.g. TX level or TA value) and the RAT employed in the serving network 120, and determines whether the serving network 120 is suitable according to the power consumption X1. In one embodiment, since the mobile device 100 is in a standby mode (or idle mode) at this time, the mobile device 100 can temporarily switch to the target network 140 (e.g. by cell selection or re-selection) to obtain a parameter P3 therefrom, so as to estimate a power consumption X3 of the mobile device 100 in the target network 140 according to the parameter P3 and the RAT employed in the target network 140. Then, the mobile device 100 can switch-back to the serving network 120. In this manner, in Step 306, the mobile device 100 can determine whether the serving network 120 is suitable according to a comparison of the power consumptions X1 and X3. For instance, the serving network 120 can be determined to be suitable if X1 is less than X3 and not suitable if otherwise.

If the serving network 120 is suitable, the mobile device 100 stays in the serving network 120; if the serving network 120 is not suitable, the mobile device switches to the target network 140 in the Step 308 (i.e. the target network 140 becomes the current serving network). Then, when the mobile device 100 is making a call to the current serving network (i.e. either the serving network 120 or the target network 140, depending on if the Step 308 is executed), the mobile device 100 obtains new parameter P2 from the current serving network. Similarly, the parameter P2, preferably, is a new TX level or a new TA value while making the call. The call could be either a voice call or a data transmission. The mobile device 100 then estimates the power consumption X2 of the mobile device 100 in the current serving network according to the new parameter P2 and the RAT employed in the current serving network, and determines whether the current serving network is suitable according to the estimated power consumption X2. In one embodiment, since the mobile device 100 is making a call at this time, the mobile device 100 can only obtain the parameter for estimating the power consumption in the current serving network other than any other network unless the mobile device 100 hands off to the other network. Thus, if the current serving network is the serving network 120, the mobile device 100 determines whether the current serving network is suitable according to a comparison of X2 and X3 (X3 is the power consumption in the target network 140 estimated before the call is made); if the current serving network is the target network 140, the mobile device 100 determines whether the current serving network is suitable according to a comparison of X2 and X1 (X1 is the power consumption in the serving network 120 estimated before the call is made).

If the current serving network is suitable, the mobile device 100 stays in the current serving network. If the serving network 120 is not suitable, the mobile device 100 switches to the current target network as described in the Step 318 above. As a result, the mobile device 100 switches between different networks according to the power consumption of the mobile device 100 in the networks. In other words, the mobile device 100 switches to the network which has lower power consumption than the other. This can achieve power saving purpose in the wireless communication system 10. Compared to the prior art, in this invention, the mobile device 100 can determine whether to switches to another network not only according to the Quality of Service but according to the power consumption in each network. In one embodiment, the serving network 120 can be a 3G network, and the target network 140 can be a 2G network.

Preferably, estimating the power consumption X1 can be regarded as estimating an average current Aad in the serving network 120. The mobile device 100 estimates the average current Aad in the serving network 120 by using a lookup table. In addition, the power consumption can also be represented in any forms, for example electrical current, voltage, as long as it is proportional to the power consumption. The lookup table can be stored in a memory or storage device in the mobile device 100 and established by a linear interpolation algorithm in advance. For example, the TA value is normally between 0 and 63, with each step representing an advance of one bit period (approximately 3.69 us). With radio waves traveling at about 300,000,000 meters per second (that is 300 meters per microsecond), one TA step then represents a change in round-trip distance (twice the propagation range) of about 1,100 meters. This means that the TA value changes for each 550-metre change in the range between a mobile device and a base station. This limit of 63×550 meters is the maximum 35 kilometers that a mobile device can be from a base station and is the upper bound on cell placement distance. Please refer to the following Tables.

Table.1 illustrates an exemplary lookup table, showing the relationship between TX level and average current for 2G system. And TA values can correspond to relative TX levels by applying the linear interpolation algorithm. TA values can be used to estimate the power consumption because the significant positive correlation between distance and TX levels.

TABLE 1

Relationship between TX level and average current for 2G system

| | Timing Advance value | | | |
|---|---|---|---|---|
| | 63 | (Linear Interpolation algorithm) | | 0 |
| TX Level | 5 | 10 | 15 | 19 |
| Average Current | 252.01 mA | 151.78 mA | 112.81 mA | 106.13 mA |

When the mobile device 100 obtains a TX level or a TA value from a 2G network, the corresponding average current can be found in Table.1. For example, if TA is 63, the TX level and average current should be 5 and 252.01 mA from this table.

Table.2 illustrates another lookup table according to the present disclosure, showing the relationship between TX levels and average current in 3G system.

TABLE 2

Relationship between TX level and average current for 3G system

| TX Level | 0 | 10 | 15 | 23 |
|---|---|---|---|---|
| Average Current | 205.00 mA | 222.70 mA | 332.20 mA | 504.72 mA |

Please note that the average currents in Table.1 and Table.2 are variant with different mobile devices.

In one embodiment, the lookup table used for looking up the average current is preset in the mobile device 100 and indicates the correspondence among average currents, parameters for estimating power consumption and the RATs employed in the networks. For example, when the RAT is 3G and the TX level is 10, the corresponding average current is 222.70 mA; when the RAT is 2G and the TX level is 10, the corresponding average current is 151.78 mA.

After the average current Aad in the serving network 120 is obtained, the mobile device 100 determines whether the serving network 120 is suitable. Preferably, the mobile device 100 can determine the serving network 120 is not suitable when the average current Aad satisfies an equation and determine the serving network 120 is suitable when the power consumption average current Aad does not satisfy the equation. The equation is represented by: Aad>Atr, wherein the Aad is the average current in the serving network 120, and Atr is the average current in the target network 140. The average current Atr can also be obtained by using the lookup table, i.e. using the TX level or TA value (e.g. the parameter P3 mentioned above) obtained previously from the target network 140 as an index to the lookup table. Besides, the equation can be rewritten as Aad−Atr>0. Namely, if the calculation result is greater than zero, it means the target network 140 has lower power consumption than the serving network 120. The mobile device 100 switches to the target network 140. If the calculation result is not greater than zero, it means the serving network 120 has lower power consumption than the serving network 120. The mobile device 100 stays in the serving network 120.

Please note that the parameters used by the mobile device 100 to estimate its power consumption can also include a signal strength level which can be derived from the signal transmitted between the mobile device 100 and the serving network 120/target network 140, and a discontinuous reception (DRX) cycle length which can be obtained from the serving network 120/target network 140. For example, the mobile device 100 can obtain the DRX cycle length included in the signal received from the network side, and obtain the signal strength level by measuring the strength of a transmitted/received signal.

Figure 4:
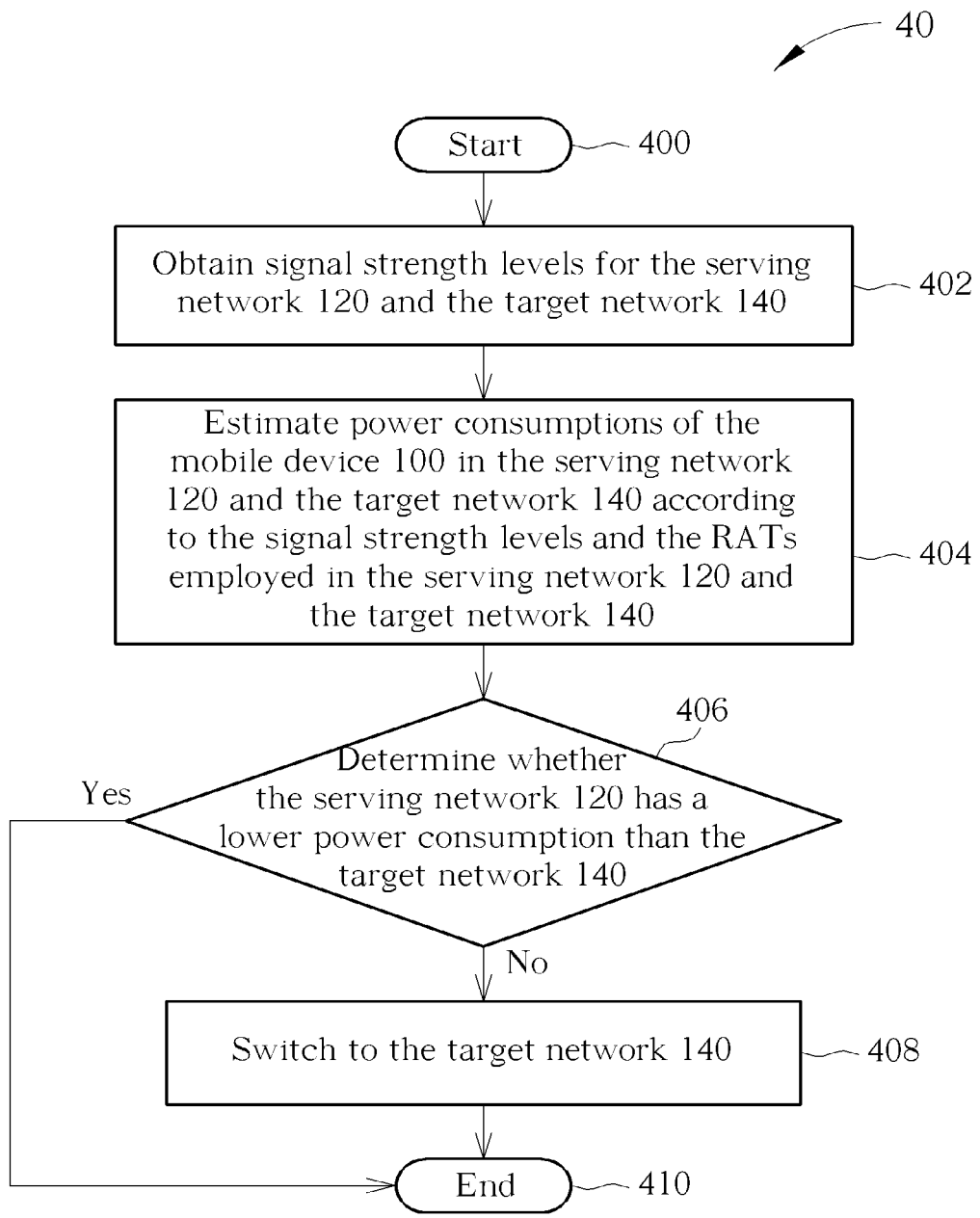
FIG. 4 is a flow chart of an exemplary process.

Please refer to FIG. 4, which is a flow chart of a process 40. The process 40 is used in the mobile device 100 for power saving in the wireless communication system 10. The process 40 can be compiled into the program code 214 and includes the following steps:

Step 400: Start.

Step 402: Obtain signal strength levels for the serving network 120 and the target network 140.

Step 404: Estimate power consumptions of the mobile device 100 in the serving network 120 and the target network 140 according to the signal strength levels and the RATs employed in the serving network 120 and the target network 140.

Step 406: Determine whether the serving network 120 has a lower power consumption than the target network 140. If so, go to the Step 410; if not, go to the Step 408.

Step 408: Switch to the target network 140.

Step 410: End.

According to the process 40, the mobile device 100 first obtains the signal strength levels for the serving network 120 and the target network 140. The signal strength level may be, for example, representing a level of power present in a signal that is sent from the mobile device 100 and received at the serving network 120 or the target network 140 (or vice versa). For example, the signal strength level may be a Received Signal Strength Indicator (RSSI) that takes into account, for example, thermal noise, interference from other transmitters, the power of a desired signal, or other characteristics. Based on the signal strength levels and the RAT employed in the networks, the mobile device 100 estimates the power consumption of the mobile device 100 in each network. For example, a lookup table stored in the memory of the mobile device 100 may be applied to determine the current consumptions (which can be used to represent power consumptions). More specifically, the lookup table may store the correspondence among different RATs, RSSIs and average currents. Thus, given a specific combination of RAT and RSSI, a corresponding average current can be obtained by using the lookup table. Table.3 illustrates an example for this lookup table.

TABLE 3

Relationship between RSSI and current consumption for different RATs

| RAT | RSSI | Current consumption |
|---|---|---|
| GSM | 5 | 70 mA/Second |
| GSM | 4 | 90 mA/Second |
| GSM | 3 | 120 mA/Second |
| ... | | |
| WCDMA | 5 | 110 mA/Second |
| WCDMA | 4 | 140 mA/Second |
| ... | | |

After determining the current consumptions for the serving network 120 and the target network 140, mobile device 100 determines which network corresponds to the lowest (or most beneficial) power consumption. If the serving network 120 corresponds to the lowest (or most beneficial) power consumption, the process 40 ends. Otherwise, the mobile device 100 switches from the serving network 120 to the target network 140 having the lowest (or most beneficial) power consumption.

In one embodiment, the estimated power consumptions in the Step 404 are average power consumptions of the mobile device 100 making a call (e.g. voice call or data call), and the process 40 is executed when the mobile device 100 is in the standby mode or making a call. In another embodiment, the estimated power consumptions in the Step 404 are average power consumptions of the mobile device 100 when the mobile device 100 is in the standby mode, and the process 40 is executed when the mobile device 100 is in the standby mode.

Figure 5:
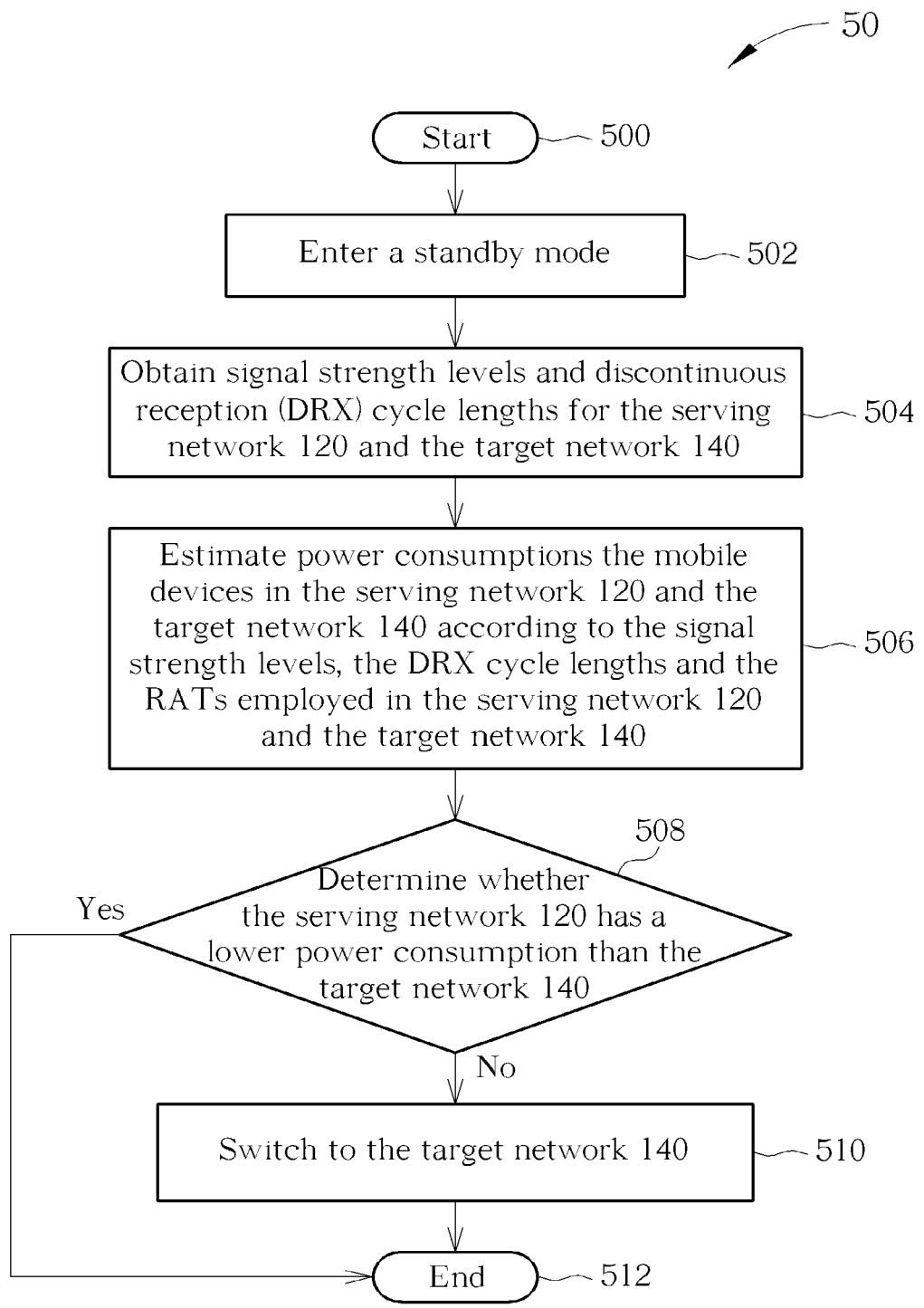
FIG. 5 is a flow chart of an exemplary process.

Please refer to FIG. 5, which is a flow chart of a process 50. The process 50 is used in the mobile device 100 for power saving in the wireless communication system 10. The process 50 can be compiled into the program code 214 and includes the following steps:

Step 500: Start.

Step 502: Enter a standby mode.

Step 504: Obtain signal strength levels and discontinuous reception (DRX) cycle lengths for the serving network 120 and the target network 140.

Step 506: Estimate power consumptions of the mobile devices in the serving network 120 and the target network 140 according to the signal strength levels, the DRX cycle lengths and the RATs employed in the serving network 120 and the target network 140.

Step 508: Determine whether the serving network 120 has a lower power consumption than the target network 140. If so, go to the Step 512; if not, go to the Step 510.

Step 510: Switch to the target network 140.

Step 512: End.

According to the process 50, the mobile device 100 decides to enter the standby mode (e.g. no phone call, web browsing, e-mail ... ). During the standby mode, the mobile device 100 can obtain the signal strength levels and the DRX cycle lengths for the serving network 120 and the target network 140. For example, the signal strength level may be a Received Signal Strength Indicator (RSSI). The DRX cycle lengths are determined by the serving network 120 and the target network 140. A shorter DRX cycle means that the mobile device 100 needs to wake up to hear a paging message more frequently and thus may consume more power than a longer DRX cycle. Based on the signal strength levels, the DRX cycle lengths and the RATs employed in the networks, the mobile device 100 estimates the power consumption of the mobile device 100 in each network when the mobile device 100 is in the standby mode. For example, a lookup table stored in the memory of the mobile device 100 may be applied to determine the current consumptions. More specifically, the lookup table may store the correspondence among different RATs, RSSIs, DRX cycle lengths and average currents. Thus, given a specific combination of RAT, RSSI and DRX cycle length, a corresponding average current can be obtained by using the lookup table. Table.4 illustrates an example for this lookup table.

TABLE 4

Relationship between RSSI, DRX cycle length and current consumption for different RATs

| RAT | RSSI | DRX cycle Length | Current Consumption |
|---|---|---|---|
| GSM | 1 | 470 ms | 10 mA/Second |
| GSM | 2 | 470 ms | 8 mA/Second |
| ... | ... | ... | ... |
| GSM | 1 | 706 ms | 9.5 mA/Second |
| ... | ... | ... | ... |
| WCDMA | 1 | 320 ms | 9 mA/Second |
| ... | ... | ... | ... |
| WCDMA | 1 | 640 ms | 7 mA/Second |
| ... | ... | ... | ... |

After determining the current consumptions for the serving network 120 and the target network 140, the mobile device 100 determines which network corresponds to the lowest (or most beneficial) power consumption. If the serving network 120 corresponds to the lowest (or most beneficial) power consumption, the process 40 ends. Otherwise, the mobile device 100 switches from the serving network 120 to the target network 140 having the lowest (or most beneficial) power consumption.

In one embodiment, when the mobile device 100 is in the standby mode (or idle mode) and performing network switching as mentioned in the Steps 318, 408 and 510, the mobile device 100 can perform a cell selection procedure to switch from the current serving network to another network. Alternatively, if the mobile device 100 has target cell information of another network, the mobile device 100 can perform a cell reselection procedure to switch to the another network. In another embodiment, when the mobile device 100 is in a dedicated/connected mode (e.g. making a call) and performing network switching as mentioned in the Steps 318 and 408, the mobile device 100 can perform an inter-RAT handover procedure to switch from the current serving network to another network. All of the cell selection procedure, cell reselection procedure and inter-RAT handover procedure are described in related 3GPP specifications, and will not be described further here.

Figure 6:
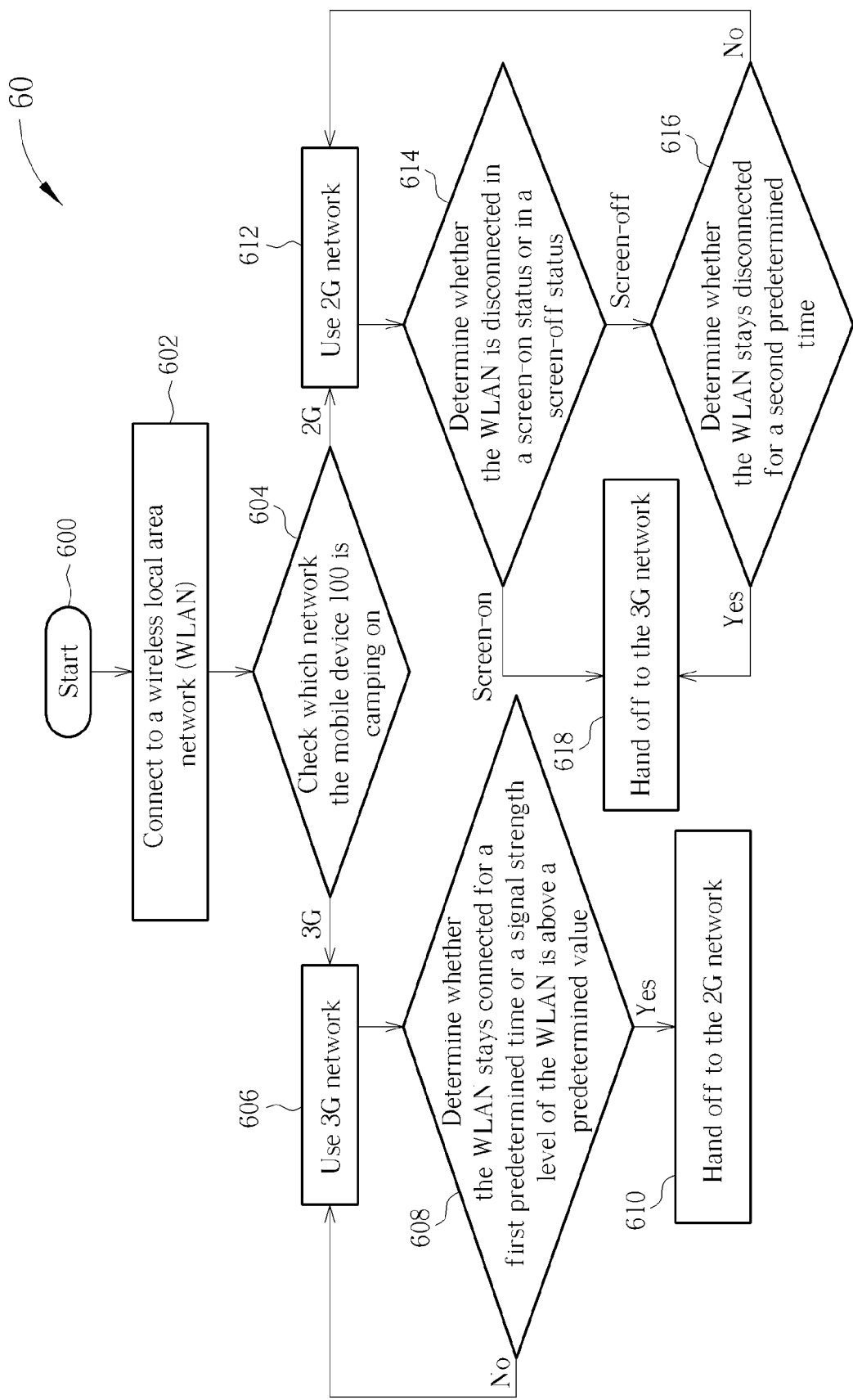
FIG. 6 is a flow chart of an exemplary process.

Please refer to FIG. 6, which is a flow chart of a process 60. The process 60 is used in the mobile device 100 for power saving in the wireless communication system 10. The process 60 can be compiled into the program code 214 and includes the following steps:

Step 600: Start.

Step 602: Connect to a wireless local area network (WLAN).

Step 604: Check which network the mobile device 100 is camping on. If the mobile device is camping on a 3G network, go to the step 606; if the mobile device is camping on a 2G network, go to the Step 612.

Step 606: Use 3G network.

Step 608: Determine whether the WLAN stays connected for a first predetermined time or a signal strength level of the WLAN is above a predetermined value. If so, go to the Step 610; if not, go to the Step 606.

Step 610: Hand off to the 2G network.

Step 612: Use 2G network.

Step 614: Determine whether the WLAN is disconnected in a screen-on status or in a screen-off status. If the WLAN is disconnected in a screen-on status, go to the Step 618; if the WLAN is disconnected in a screen-off status, go to the Step 616.

Step 616: Determine whether the WLAN stays disconnected for a second predetermined time. If so, go to the Step 618; if not, go to Step 612.

Step 618: Hand off to the 3G network.

According to the process 60, the mobile device 100 connects to the WLAN with the same service set identifier (SSID). Then, the mobile device 100 checks which network the mobile device 100 is camping on. If the mobile device is camping on a 3G network (e.g. UMTS network), the mobile device 100 determines whether the WLAN stays connected for the first predetermined time or whether the signal strength level of the WLAN is above the predetermined value. If the WLAN stays connected for the first predetermined time or the signal strength level of the WLAN is above the predetermined value, the mobile device 100 hands off to the 2G network (e.g. GSM network). If the mobile device is camping on the 2G network, the mobile device 100 hands off to the 3G network immediately when the WLAN is disconnected in a screen-on status. Or when the WLAN is disconnected in a screen-off status, the mobile device waits for the second predetermined time. If the WLAN can not get a connection back in the second predetermined time the mobile device hands off back to the 3G network. When the mobile device 100 hands off to the 2G network and the WLAN is connected, the mobile device can make a voice call via 2G network and transfer data via the WLAN. By this way, the mobile device 100 can have a better power efficiency than performing voice call and data transfer both in 3G network. Please note that the 3G network in the process 60 can also be replaced by a 4G network (e.g. LTE network).

In one embodiment, in the process 60, the 3G network and 2G network can be replaced by a first network and a second network respectively, where the mobile device 100 has a higher power consumption (e.g. higher average current) in the first network than in the second network when the mobile device 100 is making a call. Thus, for example, the first network can be a 3G or 4G network and the second network can be a 2G network.

Figure 7:
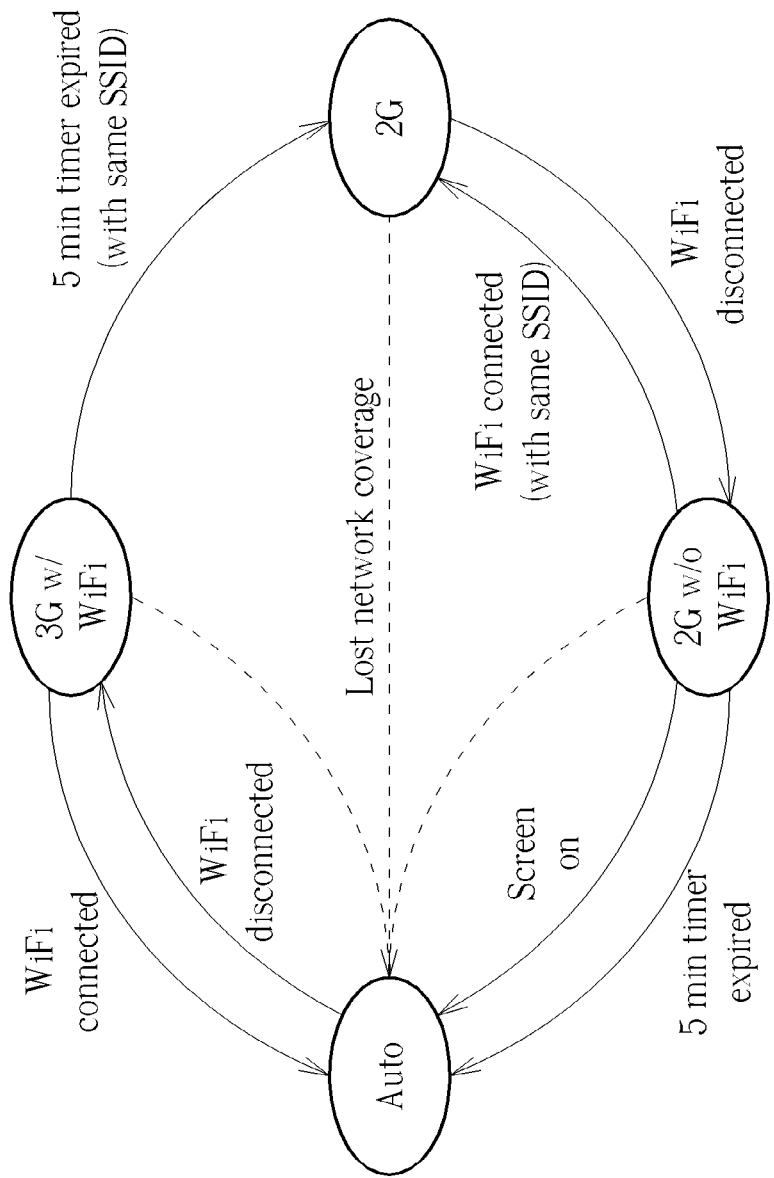
FIG. 7 illustrates states changes according to present examples

Aforementioned process 60 also involves in states change in the mobile devices 100. Please refer to FIG. 7, which illustrates states changes according to present examples. The mobile device 100 switches from an auto state to a 3G state with WiFi (or WLAN) when the mobile device 100 is connected to WiFi. In the auto state, the mobile device 100 can automatically select one of available networks to camp on. In current 3GPP specifications, a 3G network has a higher priority than a 2G network. Thus, if both 3G and 2G networks are available, the mobile device 100 will select the 3G network first. The mobile device 100 switches from the 3G state with WiFi to the auto state when the WiFi is disconnected. The mobile device 100 switches from the 3G state with WiFi to a 2G state when the WiFi stays connected for a predetermined time (e.g. 5 minutes) with the same SSID. In this way, the mobile device 100 can be prevented from switching between 3G network and 2G network frequently due to unstable WiFi connection status. The mobile device 100 switches from the 2G state to a 2G state without WiFi when the WiFi is disconnected. In the 2G state without WiFi, the mobile device 100 switches back to the 2G state when the WiFi is connected again and switches to the auto state when the WiFi is disconnected in the screen-on status or when the WiFi stays disconnected for the predetermined time in the screen-off status. When the condition of the WiFi being disconnected in the screen-on status occurs, it means that the user of the mobile device 100 may need data service very soon but he cannot use WiFi service. Thus the mobile device 100 needs to switch to the auto state. The condition of the WiFi staying disconnected for the predetermined time in the screen-off status can make the mobile device 100 stay in the 2G state if the WiFi is just disconnected for a very short time.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processor 200 processes the program code 214 related to the abovementioned processes and the processed results can perform feedback load reduction in the wireless communications system 20.

To sum up, the mobile device connects to the serving network and obtains a parameter (TX level, TA value, signal strength level or DRX cycle length) from the serving network. The mobile device estimates the power consumption according to the parameter and determines whether the serving network is suitable according to the power consumption. If the serving network is suitable, the mobile device stays in the serving network. If the serving network is not suitable, the mobile device switches to the target network. If the mobile device switches to the target network, the mobile obtain starting the process from the beginning again. Further, the mobile device obtains a new parameter when making a call. The mobile device re-estimates the power consumption according to the new parameter and determines whether the current serving network is still suitable according to the re-estimated power consumption. If the current serving network is suitable, the mobile device stays in the current serving network. If the current serving network is not suitable, the mobile device switches to another network having a lower power consumption. As a result, the mobile device switches between different networks according to the power consumption in the networks. In this situation, the mobile device switches to the network which has lower power consumption than the other, thereby achieving power saving.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power saving method for a mobile device in a wireless communication system, the power saving method comprising:

obtaining a first parameter according to a first signal transmitted between the mobile device and a first network;

estimating a first power consumption of the mobile device in the first network according to the first parameter and a first radio access technology (RAT) employed in the first network;

determining whether the first network is suitable according to at least a comparison of the first power consumption with a second power consumption of the mobile device in a second network, wherein the second network employs a second RAT different from the first RAT; and switching to the second network when the first network is not suitable;

wherein the estimating step comprises estimating a first average current of the mobile device in the first network by using a lookup table stored in the mobile device, and the lookup table is preset in the mobile device and indicates a correspondence among the first average current, the first parameter and the first RAT employed in the first network.

2. The power saving method of claim 1, wherein the step of determining whether the first network is suitable comprises:

determining the first network is not suitable when the first power consumption is greater than the second power consumption.

3. The power saving method of claim 1, wherein the mobile device is in a standby mode and before the step of determining whether the first network is suitable, the power saving method further comprising:

obtaining a second parameter according to a second signal transmitted between the mobile device and the second network; and estimating the second power consumption according to the second parameter and the second RAT.

4. The power saving method of claim 1, wherein the mobile device is during a call with the first network, and the second power consumption is estimated according to a second parameter, which is previously obtained according to a second signal transmitted between the mobile device and the second network when the mobile device is in a standby mode.

5. The power saving method of claim 1, wherein the first parameter comprises at least one of a transmission (TX) level, a Timing Advance (TA) value and a received signal strength level; the first and second power consumptions are average power consumptions of the mobile device during a call.

6. The power saving method of claim 5, wherein the step of switching to the second network is executed before the mobile device makes a call with the first network or during the call.

7. The power saving method of claim 1, wherein the first parameter comprises at least one of a received signal strength level and a discontinuous reception (DRX) cycle length; the first and second power consumptions are average power consumptions when the mobile device is in a standby mode.

8. The power saving method of claim 7, wherein the step of switching to the second network is executed when the mobile device is in the standby mode.

9. A power saving method for a mobile device in a wireless communication system, the power saving method comprising:

connecting to a wireless local area network (WLAN);

checking which network the mobile device is camping on;

determining the WLAN stays connected for a first predetermined time when the mobile device is camping on a first network; and handing off to a second network which employs a different radio access technology (RAT) from the first network.

10. The method of claim 9, wherein a first power consumption of the mobile device in the first network is higher than a second power consumption of the mobile device in the second network.

11. The method of claim 9, wherein the first network is a fourth or third generation wireless network and the second network is a second generation wireless network.

12. The method of claim 9 further comprising switching back to the first network when the WLAN is disconnected when the mobile device is camping on the second network.

13. The method of claim 12, wherein switching back to the first network when the WLAN is disconnected comprises:

switching back to the first network immediately when the WLAN is disconnected in a screen-on status of the mobile device.

14. The method of claim 12, wherein switching back to the first network when the WLAN is disconnected comprises:

determining the WLAN stays disconnected for a second predetermined time; and switching back to the first network.

15. The method of claim 9, wherein connecting to the WLAN comprises connecting to the WLAN with the same service set identifier (SSID).

16. The method of claim 9 further comprising making a voice call via the second network and transferring data via the WLAN when the mobile device hands off to the second network.

* * * * *